H. S. HUIDEKOPER.
Steam Heater.
No. 87,567.
Patented March 9, 1869.
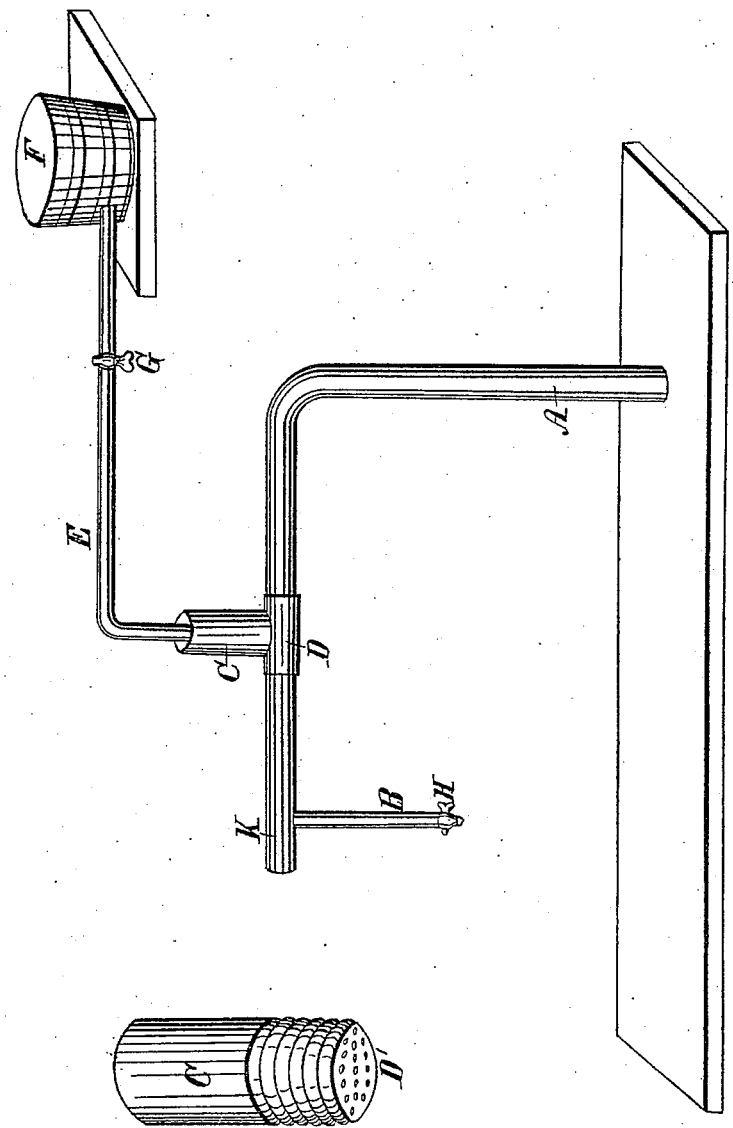

HENRY S. HUIDEKOPER, OF MEADVILLE, PENNSYLVANIA.

Letters Patent No. 87,567, dated March 9, 1869.

IMPROVEMENT IN APPARATUS FOR HEATING WATER BY STEAM.

The Schedule referred to in these Letters Patent and making part of the same.

*To all whom it may concern:*

Be it known that I, HENRY S. HUIDEKOPER, of the city of Meadville, in the State of Pennsylvania, have invented a new and improved Machine for Heating Water by Steam; and I do hereby declare that the following is a full and exact description of the same, reference being had to the accompanying drawings, and the letters of reference marked thereon.

A is a steam-pipe from a boiler, or it may be the "exhaust-pipe" from an engine.

D is a connection between the pipe A, and a continuation of the pipe K.

C is a tube, with a "watering-can" head at the lower end, which screws into the connection D. (See D'.)

This head may be perforated with two or more holes, as may be desired.

E is a cold-water pipe from the tank F, with a cock, at G.

B is a water-pipe, with a cock, H.

The operation of my invention is as follows, to wit:

As the heated steam from the exhaust-pipe A passes through the tube A K, the cock G is turned, and a spray of water let into the pipe A K, at D, from the tank F.

This spray, or stream of water, coming in contact with the steam, condenses the steam, while the steam heats the water, which, passing along toward K, runs down the pipe B, and may be drawn off at H.

By this construction, the heat of the exhaust steam, which otherwise would be wasted, may be used to heat water for dyeing-purposes in factories, or for any purpose where hot water may be wanted.

What I claim as my invention, and desire to secure by Letters Patent of the United States, is—

The construction described, whereby the cold water from a tank or stream may be let into the exhaust-pipe or steam-pipe A K, in two or more streams, by the means of the watering-can head C D', for the purposes set forth.

H. S. HUIDEKOPER.

Witnesses:
A. B. RICHMOND,
R. LUTTGEN.